United States Patent
Micken et al.

(10) Patent No.: US 10,400,930 B2
(45) Date of Patent: Sep. 3, 2019

(54) COUPLING

(71) Applicant: Dixon Valve & Coupling Company Inc., Chestertown, MD (US)

(72) Inventors: Matthew Micken, Millington, MD (US); James Shifrin, Chestertown, MD (US); Maximilian de Arriz, Chestertown, MD (US); Edward Sander, Wilmington, DE (US)

(73) Assignee: Dixon Valve & Coupling Company, LLC, Chestertown, MD (US)

(*) Notice: Subject to any disclaimer, the term of this patent is extended or adjusted under 35 U.S.C. 154(b) by 463 days.

(21) Appl. No.: 15/046,138

(22) Filed: Feb. 17, 2016

(65) Prior Publication Data

US 2016/0245442 A1 Aug. 25, 2016

Related U.S. Application Data

(60) Provisional application No. 62/118,241, filed on Feb. 19, 2015.

(51) Int. Cl.
*F16L 37/096* (2006.01)
*F16L 17/025* (2006.01)

(52) U.S. Cl.
CPC .......... *F16L 37/096* (2013.01); *F16L 17/025* (2013.01)

(58) Field of Classification Search
CPC ...... F16L 37/096; F16L 17/025; F16L 37/084
USPC ........................................ 285/317, 312, 308
See application file for complete search history.

(56) References Cited

U.S. PATENT DOCUMENTS

| | | | | |
|---|---|---|---|---|
| 1,740,015 A | * | 12/1929 | Hooper | F16L 37/096 251/149.6 |
| 1,903,445 A | * | 4/1933 | Ernst | F16L 37/096 285/242 |
| 3,124,374 A | | 3/1964 | Krapp | |
| 3,314,698 A | * | 4/1967 | Owens | F16L 37/18 285/312 |
| 3,976,313 A | | 8/1976 | Lauffenburger et al. | |
| 4,220,360 A | * | 9/1980 | Jacek | F16L 37/096 285/317 |
| 4,222,593 A | | 9/1980 | Lauffenburger | |
| 4,254,973 A | * | 3/1981 | Benjamin | F16L 37/18 285/312 |
| 4,295,670 A | | 10/1981 | Goodall et al. | |
| 4,444,419 A | * | 4/1984 | Maeshiba | F16L 37/00 285/12 |
| 4,647,075 A | | 3/1987 | Vargo | |
| 4,691,942 A | | 9/1987 | Ford | |
| 4,802,694 A | | 2/1989 | Vargo | |

(Continued)

FOREIGN PATENT DOCUMENTS

FR 974882 A * 2/1951

*Primary Examiner* — David Bochna
*Assistant Examiner* — James A Linford
(74) *Attorney, Agent, or Firm* — Howson & Howson LLP

(57) ABSTRACT

A quick-disconnect coupling including a hollow coupler body having opposite open ends and defining an adaptor-receiving socket therein, a gasket housed within the coupler body at a base of the adaptor-receiving socket, the gasket having a sealing ring and a bellows portion, and at least one locking tab connected to the coupler body such that the at least one locking tab is able to pivot relative to the coupler body between a locking position and an unlocking position for purposes of locking and releasing an adaptor to the coupler body.

17 Claims, 4 Drawing Sheets

(56) References Cited

U.S. PATENT DOCUMENTS

| | | | |
|---|---|---|---|
| 4,871,195 A | 10/1989 | Parrish | |
| 5,740,846 A * | 4/1998 | Larson | B64F 1/362 |
| | | | 141/113 |
| 5,988,693 A | 11/1999 | Street | |
| 6,053,540 A | 4/2000 | Meyer | |
| 6,206,431 B1 | 3/2001 | Street | |
| 6,224,113 B1 | 5/2001 | Chien | |
| 6,412,827 B1 | 7/2002 | Barclay et al. | |
| 6,447,016 B2 | 9/2002 | Collier | |
| 8,051,882 B2 | 11/2011 | Koeninger et al. | |
| 8,186,718 B2 | 5/2012 | Chen | |
| 2004/0026873 A1 | 2/2004 | Davey | |
| 2006/0244222 A1 | 11/2006 | Davey | |
| 2008/0284108 A1 | 11/2008 | Davey | |
| 2009/0321670 A1 * | 12/2009 | Huang | B05B 9/0861 |
| | | | 251/129.03 |

\* cited by examiner

COUPLING

CROSS REFERENCE TO RELATED APPLICATIONS

This application claims the benefit under 35 USC § 119(e) of U.S. Provisional Patent Application No. 62/118,241, filed Feb. 19, 2015.

BACKGROUND

This disclosure relates to the field of couplings for hoses and pipes, in particular, quick-disconnect couplings.

DETAILED DESCRIPTION

Figure 1:
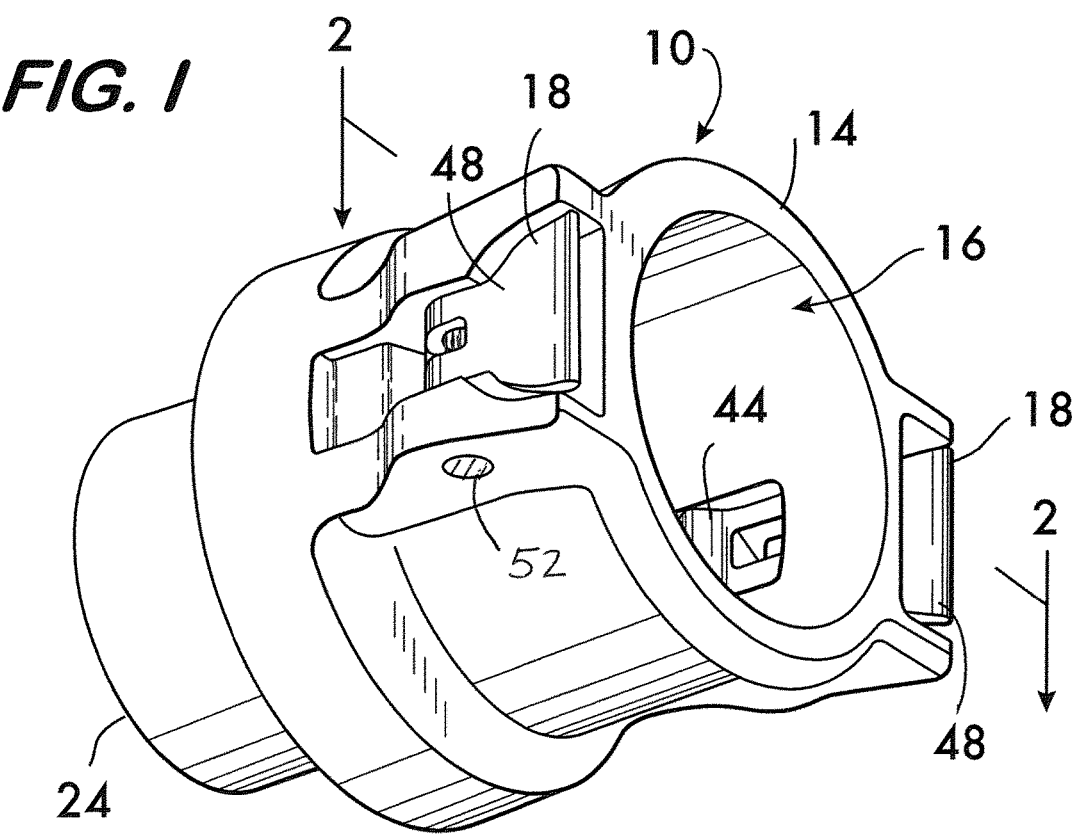
FIG. 1 is a perspective view of a coupler body in accordance with an embodiment.
Figure 2:
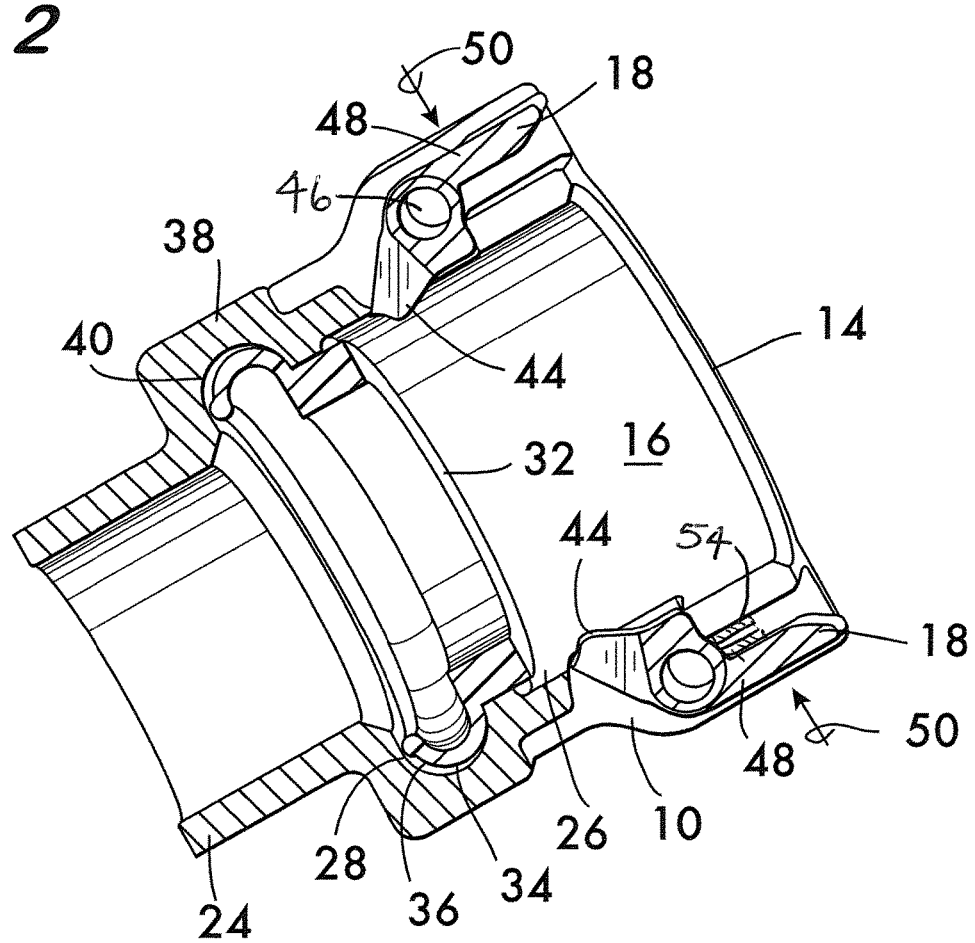
FIG. 2 is a cross-sectional view of the coupler body of FIG. 1 taken along a longitudinal axis of the coupler body in accordance to an embodiment.
Figure 3:
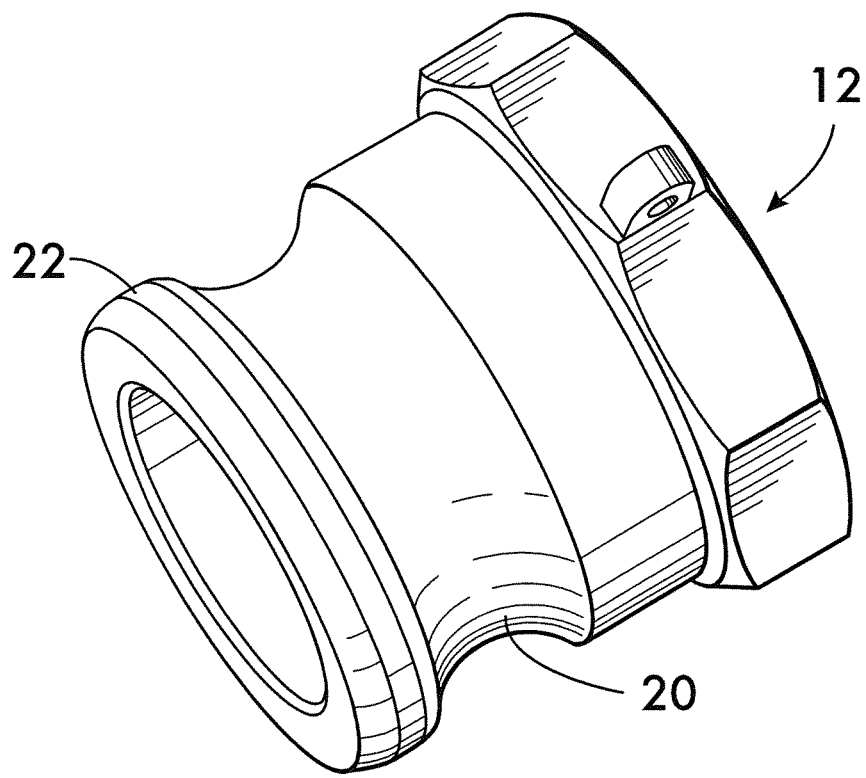
FIG. 3 is a perspective view of an adaptor in accordance to an embodiment.

The hollow coupler body 10 shown in FIGS. 1 and 2 and the hollow adaptor 12 shown in FIG. 3 are adapted to be connected together and function as male and female coupling members for ends of hoses, pipes and the like in a manner enabling quick disconnection thereof. An end 14 of the coupler body 10 forms a socket 16 for receiving the adaptor 12. The adaptor 12 can be removably locked therein via engagement of locking tabs 18 discussed below in further detail in a circumferential groove 20 extending about an outer periphery 22 of the adaptor 12. As will be discussed below, this engagement provides a quick-disconnect locking coupling between the coupling body 10 and adaptor 12.

As best illustrated in FIG. 2, the coupler body 10 includes opposite open ends 14 and 24. As discussed above, end 14 defines the socket 16 into which an adaptor can be received and removably locked. The opposite end 24 of the coupler body 10 can be connected to a hose or pipe permitting the passage of a fluid or liquid therethrough.

Directly adjacent the bottom or base 26 of socket 16, a seat or ledge 28 is provided within the coupler body 10 for supporting a gasket. As shown in FIG. 2, the gasket is a bellows style gasket and includes a seal ring 32 facing the socket end 14 of the coupler body 10 and an outwardly-extending, generally C-shaped bellows portion 34 extending from a lower part of the seal ring 32 to engage the seat 28. The bellows portion 34 can include a bead 36 at its terminal end and one or more beads or ridges (not shown) along the arcuate C-shaped bellows portion 34. A wall 38 of the coupler body 10 adjacent the seat 28 can include an inner peripheral groove, cavity or recess 40 for receiving and accommodating the outwardly-extending bellows portion 34 of the gasket. The cavity 40 can have a complementary C-shaped contour to closely match and engage the C-shaped bellows portion 34 of the gasket. See FIG. 2.

As also best shown in FIG. 2, the coupler body 10 can also include one or more locking tabs 18, such as a pair of opposed locking tabs 18. Each locking tab 18 includes a locking extension 44 which can be extending into the socket 16 for extending into the circumferential groove 20 of the adaptor 12 to secure the adaptor 12 to the coupler body 10. Each locking tab 18 can be secured to the coupler body 10 with a locking pin 52 or the like which extends laterally through a hollow channel 46 in the locking tab 18 and permits the locking tab 18 to pivot about an axis defined by the locking pin.

The locking tabs 18 are shown in FIG. 2 in their normal locking position; however, each may be pivoted into a non-locking position such that the locking extension 44 do not extend within the socket 16 for purposes of permitting an otherwise captured adaptor to be released from and slid out of the socket 16 of the coupler body 10 via the open end 14. As an example, in FIG. 2, exterior parts 48 of the locking tabs 18 that can be accessed at a location exterior of the socket 16 can be simultaneously pressed inward by a user in directions shown by arrows 50 to pivot the locking tabs 18 such that the parts 48 of the locking tabs 18 pivot inwardly toward each other and the locking extensions 44 of the locking tabs 18 pivot outwardly away from each other to a position outside the socket 16. In this manner, an adaptor captured within the socket 16 can be unlocked from the coupler body 10 and removed.

Figure 5:
FIG. 5 is a perspective view of a torsion spring.

A spring, such as a torsion spring 54 (see FIG. 5) which wraps about the locking pin and has ends extending between and pressing against the coupler body and the locking tabs (see FIG. 2), can be connected to the locking tab 18 adjacent the locking pin to resiliently exert a force on the locking tab 18 relative to the coupler body so as to normally position the locking tabs 18 in a locking position, for instance, the position shown in FIG. 2. Thus, an inserted adaptor remains connected to the coupler body 10 until a user applies an appropriate amount of force against the spring force to pivot the locking tabs 18 into an unlocking position (i.e., to press the ends of the torsion spring toward each other against the force of the torsion spring).

Accordingly, the spring-operated locking tabs 18 provide a low force, passive engagement/locking system for an assembly of the coupler body 10 and adaptor 12 that does not require the use of manually-operated cam arms, and the bellows style gasket housed by the coupler body 10 provides a leak-free seal between the coupler body 10 and adaptor 12 that does not require excessive force to create. The coupler body 10 can be an integrally formed component providing the seat 28 and cavity 40 for housing, capturing and engaging the bellows style gasket and providing mounting locations for the locking tabs 18, torsion springs, and locking pins. The coupler body 10 can be sized to allow the adaptor 12 to slide inside and seat against the seal ring 32 of the bellows style gasket at an appropriate depth to not only produce a leak-free seal, but also, to permit engagement of the locking extension 44 of the locking tabs 18 within the circumferential groove 20 or the like of the adaptor 12.

When an adaptor is first slid into the socket 16 of the coupler body 10, the locking tabs 18 are engaged by the outer periphery 22 of the adaptor 12 and are thereby forced to pivot about the retaining pins against the force of the torsion spring such the locking extensions 44 are moved outwardly enabling the adaptor 12 to be fully inserted within the socket 16 into sealing engagement with the gasket. During this procedure, the operator or user merely inserts the adaptor 12 into the socket 16 of the coupler body 10 with sufficient force only to automatically cause the locking tabs 18 to be pivoted into the unlocking position. The user is not required to exert any force to form a seal and need not engage or adjust the locking tabs 18. Rather, when the adaptor 12 is inserted into the socket 16 to a depth by which the circumferential groove 20 of the adaptor 12 aligns with the locking extensions 44 of the locking tabs 18, the tabs 18 resiliently and automatically pivot into the locking position under the force of the torsion springs to engage the adaptor 12 within the circumferential groove 20 to positively lock the adaptor 12 within the coupler body 10 without operator assistance. Thus, a passive locking process is provided.

For purposes of disengaging the adaptor 12 from the coupler body 10, an operator merely simultaneously presses on each exterior part 48 of the locking tabs 18 as indicated by arrows 50 in FIG. 2 to free the adaptor 12 and permit it to be slid out of the coupler body 10.

The bellows style gasket permits the formation of a tight and leak-free seal despite the application of only a relatively small amount of compressive force applied on the gasket between the adaptor 12 and coupler body 10. Thus, an operator merely has to engage the adaptor 12 into the coupler body 12 with sufficient force to permit the locking tabs 14 to seat within the circumferential groove 20 of the adaptor 12. In this embodiment, cam arms are not required to create sufficient compression of a gasket to form a seal; rather, this is accomplished passively by inserting the adaptor 12 with only a minimal amount of insertion force required by the operator.

By way of example, and not be way of limitation, the coupler body 12 may be provided in 1½, 2, 3, and 4 inch sizes and may be made of aluminum, brass, stainless steel, steel and steel alloys, iron, plastic or composite materials. Further, the use of the above referenced resiliently pivoted locking tabs 18 and bellows-style gasket can permit such fittings to be rated double that of like size conventional cam and groove fittings. For instance, a like size conventional cam and groove fittings that is rated to no more than 250 psi can be replaced with a like size of the above referenced quick-disconnect coupling to achieve ratings of 500 psi or greater.

Figure 4:
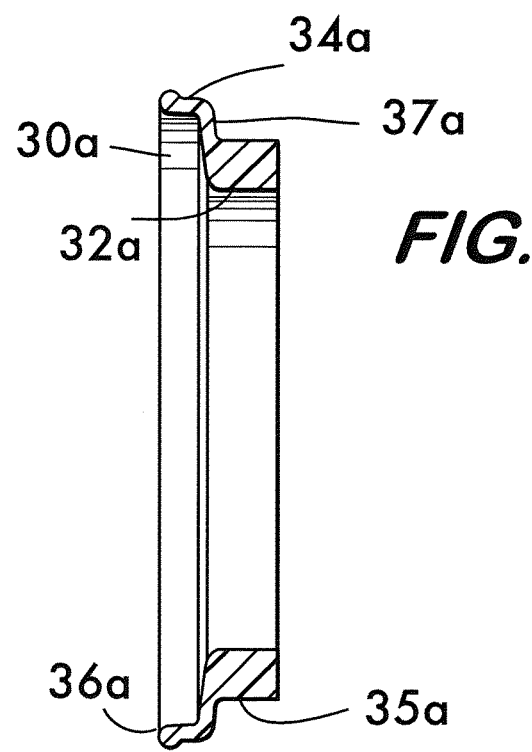
FIG. 4 is a cross-sectional view of an alternate embodiment of gasket in accordance to an embodiment.

FIG. 4 provides an illustration of an alternate gasket 30a for the above referenced coupler in accordance to an embodiment. The gasket 30a includes a seal ring 32a and an outwardly-extending portion 34a extending from the seal ring 32a. The outwardly-extending portion 34a is generally "L" shaped and includes an outer annular portion 35a having a bead 36a at its terminal end. The outwardly-extending portion 34a also includes a sloped wall 37a that interconnects the outer annular portion 35a to the seal ring 32a. The sloped wall 37a extends at an angle relative to the seal ring 32a and the outer annular portion 35a of greater than 90° (i.e., not perfectly perpendicular). For instance, as shown in FIG. 4, the angle formed between the sloped wall 37a and each of the seal ring 32a and the outer annular portion 35a is about 101° (i.e. 90° plus 11°). Thus, the sloped wall 37a shown in FIG. 4 is shown as extending outwardly and upwardly from the edge of the seal ring 32a.

The foregoing description and specific embodiments are merely illustrative of the principles thereof, and various modifications and additions may be made to the apparatus by those skilled in the art, without departing from the spirit and scope of this invention.

We claim:

1. A quick-disconnect coupling, comprising:
    a hollow coupler body having opposite open ends and defining an adaptor-receiving socket therein;
    a gasket housed within the coupler body at a base of the adaptor-receiving socket, said gasket having a sealing ring and a bellows portion;
    a locking tab connected to the coupler body such that the locking tab is able to pivot relative to the coupler body between a normal locking position and an unlocking position, the locking tab having a locking extension that extends into the adaptor-receiving socket of the coupler body when the locking tab is in the normal locking position;
    a locking pin securing the locking tab to the coupler body, the locking pin extending through the locking tab and defining an axis about which the locking tab pivots relative to the coupler body;
    a torsion spring adapted to exert a force between the coupler body and the locking tab to resiliently force the locking tab into the normal locking position, said torsion spring having a portion wrapping about the locking pin and having opposite end portions extending between and pressing against the coupler body and the locking tab; and
    a separate hollow adaptor having a circumferential groove in an outer periphery thereof, said adaptor fitting within the adaptor-receiving socket of the coupler body such that the locking extension of the locking tab in the normal locking position extends within the circumferential groove to engage and lock the adaptor within the coupler body in a condition by which a leak-free seal is formed by the gasket between the adaptor and the coupler body at the base of the socket.

2. The quick-disconnect coupling according to claim 1, wherein the locking tab has a part exterior of the socket to which force can be applied to cause the locking tab to pivot to the unlocking position in which the locking extension is caused to be withdrawn from the socket to unlock the adaptor relative to the coupler body.

3. The quick-disconnect coupling according to claim 2, wherein when the adaptor is inserted into the socket of the coupler body, the locking tab is forced to pivot to the unlocking position until the circumferential groove of the adapter aligns with the locking extension of the locking tab to permit the locking tab to resiliently return to the locking position by the torsion spring to lock the adaptor within the coupler body.

4. The quick-disconnect coupling according to claim 3, wherein a pair of locking tabs are connected to the coupler body at opposed locations on the coupling body about the socket.

5. The quick-disconnect coupling according to claim 3, wherein the coupler body defines a seat and a circumferential cavity therein for receiving, supporting and engaging the bellows portion of the gasket.

6. The quick-disconnect coupling according to claim 3, wherein the bellows portion of the gasket is C-shaped and extends outwardly from a lower part of the sealing ring.

7. The quick-disconnect coupling according to claim 3, wherein the bellows portion of the gasket is L-shaped and extends outwardly from an end of the sealing ring.

8. The quick-disconnect coupling according to claim 7, wherein the L-shaped bellows portion of the gasket includes an outer annular portion and a sloped wall that interconnects the outer annular portion to the sealing ring.

9. The quick-disconnect coupling according to claim 8, wherein an angle formed between the sloped wall and the outer annular portion is greater than 90° and wherein an angle formed between the sloped wall and the sealing ring is greater than 90°.

10. The quick-disconnect coupling according to claim 8, wherein an angle formed between the sloped wall and the outer annular portion 101° and wherein an angle formed between the sloped wall and the sealing ring is 101°.

11. The quick-disconnect coupling according to claim 1, wherein when the adaptor is inserted into the socket of the coupler body, the locking tab is forced to pivot to the unlocking position until the circumferential groove of the adapter aligns with the locking extension of the locking tab to permit the locking tab to resiliently return to the locking position by the torsion spring to lock the adaptor within the coupler body.

12. The quick-disconnect coupling according to claim 1, wherein a pair of locking tabs are connected to the coupler body at opposed locations on the coupling body about the socket.

13. A quick-disconnect coupling, comprising:
- a hollow coupler body having opposite open ends and defining an adaptor-receiving socket therein;
- a gasket housed within the coupler body at a base of the adaptor-receiving socket;
- a locking tab connected to the coupler body such that the locking tab is able to pivot relative to the coupler body between a normal locking position and an unlocking position, the locking tab having a locking extension that extends into the adaptor-receiving socket of the coupler body when the locking tab is in the normal locking position;
- a locking pin securing the locking tab to the coupler body, the locking pin extending through the locking tab and defining an axis about which the locking tab pivots relative to the coupler body;
- a torsion spring adapted to exert a force between the coupler body and the locking tab to resiliently force the locking tab into the normal locking position, said torsion spring having a portion wrapping about the locking pin and having opposite end portions extending between and pressing against the coupler body and the locking tab; and
- a separate hollow adaptor having a circumferential groove in an outer periphery thereof, said adaptor fitting within the adaptor-receiving socket of the coupler body such that the locking extension of the locking tab in the normal locking position extends within the circumferential groove to engage and lock the adaptor within the coupler body in a condition by which a leak-free seal is formed by the gasket between the adaptor and the coupler body at the base of the socket.

14. The quick-disconnect coupling according to claim 13, wherein the locking tab has a part exterior of the socket to which force can be applied to cause the locking tab to pivot to the unlocking position in which the locking extension is caused to be withdrawn from the socket to unlock the adaptor relative to the coupler body.

15. The quick-disconnect coupling according to claim 13, wherein when the adaptor is inserted into the socket of the coupler body, the locking tab is forced to pivot to the unlocking position until the circumferential groove of the adapter aligns with the locking extension of the locking tab to permit the locking tab to resiliently return to the locking position by the torsion spring to lock the adaptor within the coupler body.

16. The quick-disconnect coupling according to claim 13, wherein a pair of locking tabs are connected to the coupler body at opposed locations on the coupling body about the socket.

17. The quick-disconnect coupling according to claim 13, wherein the gasket includes a sealing ring.

\* \* \* \* \*